J. RIEHL.
LOGOTYPE MACHINE.
APPLICATION FILED MAY 15, 1914.

1,137,353.

Patented Apr. 27, 1915.
9 SHEETS—SHEET 1.

Witnesses

Inventor
J. Riehl.
By 
Attorney

J. RIEHL.
LOGOTYPE MACHINE.
APPLICATION FILED MAY 15, 1914.

1,137,353.

Patented Apr. 27, 1915.
9 SHEETS—SHEET 7.

Inventor
J. Riehl.

Witnesses

J. RIEHL.
LOGOTYPE MACHINE.
APPLICATION FILED MAY 15, 1914.

1,137,353.

Patented Apr. 27, 1915.
9 SHEETS—SHEET 8.

Witnesses
C. R. Bealle.
Rob't Meyer.

Inventor
J. Riehl.

By
Attorney

UNITED STATES PATENT OFFICE.

JUSTUS RIEHL, OF BALTIMORE, MARYLAND, ASSIGNOR, BY MESNE ASSIGNMENTS, TO JOHN NORRIS McFARLAND.

LOGOTYPE-MACHINE.

1,137,353.  Specification of Letters Patent.  Patented Apr. 27, 1915.

Application filed May 15, 1914. Serial No. 838,770.

*To all whom it may concern:*

Be it known that I, JUSTUS RIEHL, a citizen of the United States, residing in the city of Baltimore and State of Maryland, have invented certain new and useful Improvements in Logotype-Machines, of which the following is a specification.

This invention relates to improvements in machines for the production of printing or type characters in lines of any convenient length, the characters being formed in relief upon type bars, from an assembled line of matrices engraved in plates, which plates are properly positioned for forming the lines of type by means manipulated by the operation of finger keys; and the primary object of this invention is the provision of a machine as specified for forming type for printing tabular work such as tariff sheets, time tables or the like.

The invention consists: first; in the provision of a logotype machine having a plurality of matrices manually operable for movement over a casting slot in the machine and the provision of novel means including a finger keyboard and a plurality of slidable pins operable by said finger keys, for controlling the positioning of the matrices over the casting slot for forming the desired characters upon the type bars: second; in the production of a novel form of locking means for holding the matrices firmly in position over the casting slot, which locking means is automatically operated for releasing the matrices and ejecting the type bars after the latter are cast: third; the mechanism for repositioning the slidable finger key operated pins: fourth; in the melting pot, pumps for forcing the molten metal through the casting slot, and the cam mechanism for tilting the melting pot for breaking the connection between the metal therein and the bar of type after the latter has been formed: fifth; in the mechanism for operating the various parts of the machine at the proper time to insure the proper performing of its functions: sixth; in a mechanism for automatically redistributing or repositioning the matrices after the line of type has been formed: seventh; the springs and the spring spools for moving the matrices to their proper position preparatory to the forming of the type characters and in such novel features of construction, combination and arrangement of parts as will hereinafter appear.

In describing the invention in detail reference will be had to the accompanying drawings wherein like characters designate like and corresponding parts throughout the several views, and in which.

Figure 4:
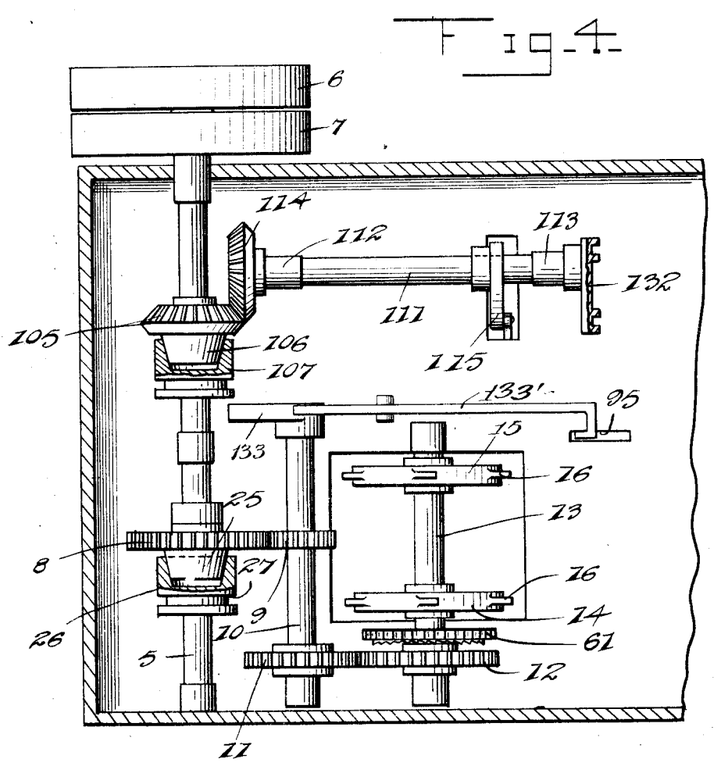
Fig. 4 is a detail plan view of a part of the mechanism for controlling the operation of the various parts of the machine.

*Driving and shifting mechanism.*—The logotype machine has the usual type of supporting structure 1, which structure has journaled in suitable bearings carried thereby, a shaft 5, which shaft has pulleys 6 and 7 mounted upon one terminal end thereof, one of which pulleys is mounted for loose rotation upon the shaft while the other is keyed thereupon, as is usual in the construction of pulleys for transmitting power to the propelling shafts of machinery. The shaft 5 has a gear 8 mounted thereupon, which gear meshes with a pinion 9 mounted upon the shaft 10. The shaft 10 is rotatably supported by the frame 1, and it has an intermittent gear 11 mounted thereupon, which gear meshes with a second intermittent gear 12. The intermittent gear 12 is mounted upon the shaft 13, which shaft has sprockets 14 and 15 mounted thereupon. The sprockets 14 and 15 are of a novel form of construction, having elongated straight sides from which the teeth 16 thereof project from the communicating corners of the straight sides as is clearly shown in Figs. 1 and 4 of the drawings. A chain 17 passes about the sprocket wheels 14 and 15 and about sprocket wheels 18, which are arranged upon the opposite end of the supporting structure 1 of the sprockets 14 and 15, and are positioned in direct alinement with the sprockets 14 and 15. The sprocket chain 17 has a plurality of plates 20 carried thereby, the function of which will be hereinafter more fully described. The gear 8 has a clutch cone 25 formed upon one side thereof, which clutch cone is adapted for insertion into the clutch shell 26, which is slidably mounted upon the shaft 5, and has an annular recess 27 formed therein, which recess receives the end of the forked clutch actuating lever 28. The clutch actuating lever 28 is connected to a rod 29, which rod is in turn connected to a rod or bar 30, through the medium of a crank arm 31. The rod or bar 30 is positioned near the lower end of the supporting frame 1 of the logotype machine, and has a treadle 32 mounted thereupon for the actuation of the rod for moving the clutch shell 26 into or out of frictional peripheral engagement with the clutch cone 25 for imparting rotation to the clutch cone and the gear 8 which is carried thereby for operating the sprockets 14 and 15 and the sprocket chain 17 which is carried thereby.

Figure 12:
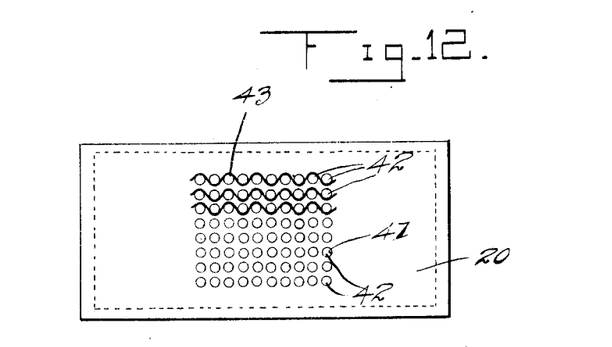
Fig. 12 is a detail plan view of the plates which carry the pins which are operated by the finger keys for regulating the positioning of the matrices.
Figure 13:
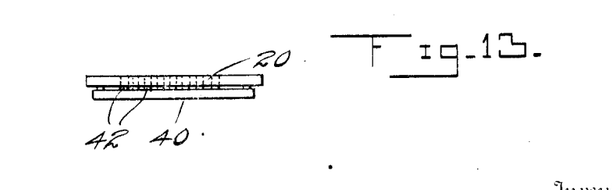
Fig. 13 is an edge view of the plate shown in Fig. 12.
Figure 14:
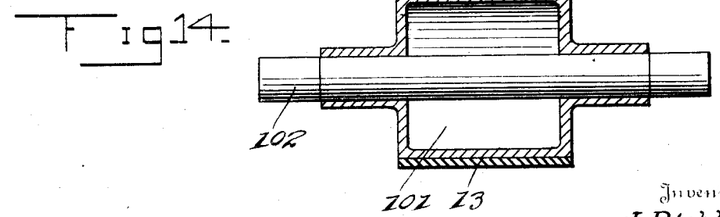
Fig. 14 is a sectional view of a part of the mechanism for repositioning the slidable pins.

*Mechanism for properly positioning the slidable matrices over the casting slot.*—The sprocket chain 17 has plates 40 secured thereto at spaced intervals along its length, which plates are provided with a plurality of serially arranged openings 41, in which openings are slidably seated pins 42. The pins 42 are slidably seated in the openings 41 in the plates 40, and extend therethrough into the plates 20, which plates are positioned above the plates 40. The pins 42 are held within the openings 41 by resilient lengths of wire 43, which are wound sinuously about each row of the pins, engaging the surface of the alternate pins upon the same side, as is clearly shown in Fig. 12 of the drawings, thereby securely binding the pins in the openings 41 and holding them against falling out, but permitting of their sliding movement therein when actuated by mechanism provided for this purpose.

Figure 10:
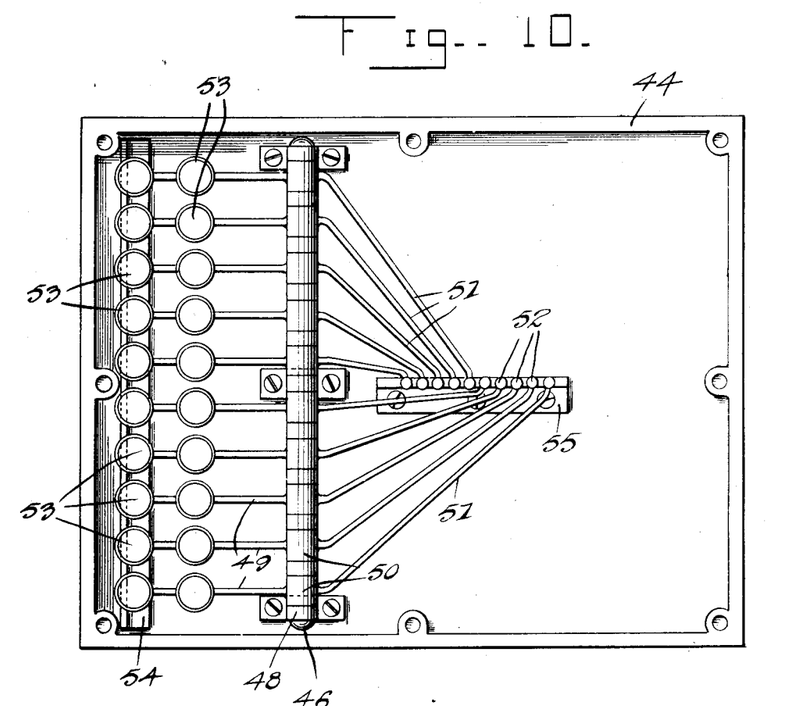
Fig. 10 is a plan view of the finger keyboard, showing the top protective covering plate removed therefrom.
Figure 11:
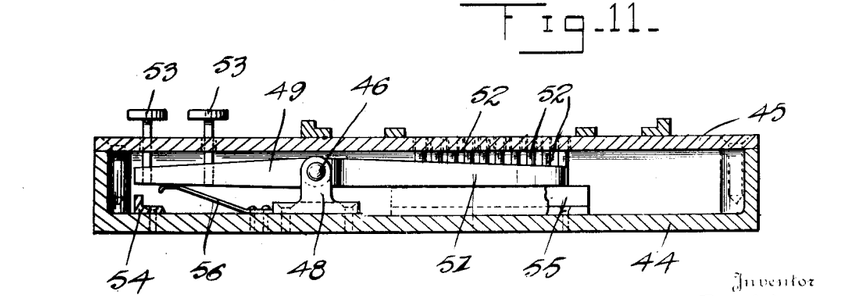
Fig. 11 is a cross sectional view through the finger key-board.

The supporting frame 1 of the logotype machine has a keyboard supporting casing 44 supported thereby, which keyboard casing has a removable cover 45 mounted upon its upper end, and a shaft 46 extending transversely thereacross, which shaft is journaled in bearings 47 and 48 mounted within the casing 44. The shaft 46 has pivotally mounted thereupon a plurality of arms 49, which arms are formed upon collars 50, within which collars the shaft 46 is seated. The collars 50 have arms 51 formed thereupon and extending therefrom from the opposite sides of the collars to which the arms 49 are attached. The arms 51 radiate inwardly toward the center of the casing 44 and have plungers 52 formed upon their free terminal ends, which plungers are arranged in alinement one with the other, as is clearly shown in Fig. 10 of the drawings. The plungers 52 are provided for slidable movement within openings which are formed in the plate 45, so that when the arms 49 are forced downwardly by pressure being applied to the finger keys 53, the arms 51 will be forced upwardly and the plungers operated in the openings in the plate 45 will engage the lower end of the pins 42, forcing them upwardly and causing them to project above the upper surfaces of the plates 20, where they will be held by the action of the sinuous resilient wires 43.

The arms 49 are limited in their downward movement by angle bars 54, which are positioned beneath the terminal ends of the arms, while the arms 51 are limited by the angle plate 55, which is secured to the base of the casing 44 and extends longitudinally therein so as to provide an abutting base for the terminal ends of each of the arms 51. Flat springs 56 are secured to the base of the casing 44, and they engage the under surfaces of the levers 49 for repositioning them after they have been actuated by the operation of the finger keys 53. Each of the arms 49 have two finger keys 53 secured thereto, one of which finger keys bears numerical designations and the other character designations. The two keys are provided for the convenience of the operator, so as to facilitate the depressing of the proper key.

Figure 9:
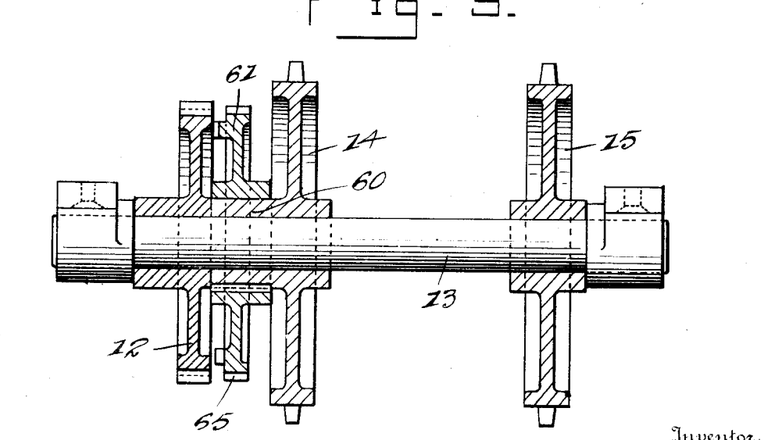
Fig. 9 is a detail sectional view of a part of the gear mechanism for operating the plates and the pins carried thereby for regulating the positioning of the matrices preparatory to forming the line of type.
Figures 16, 17:
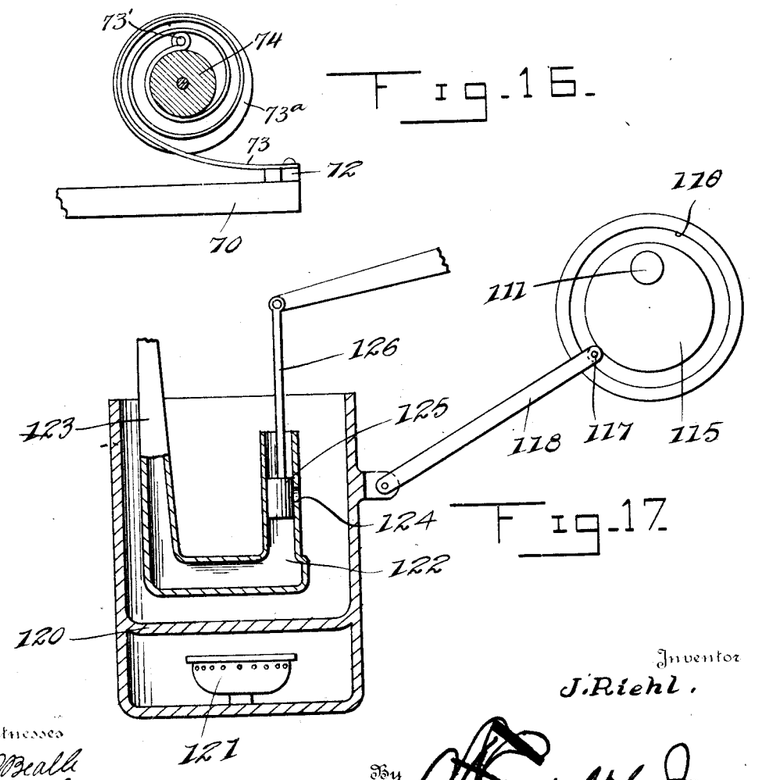
Fig. 16 is a detail view of the spring spool showing the connection therebetween and the matrices.
Fig. 17 is a detail view of the melting pot construction and the means for tilting the same.

The finger keys 53 each bear different designating characters such as numerals, commas, periods, and various other characters such as are necessary for the setting up of type for printing purposes, so that when the various finger keys are operated the pin 42 carried by the plate 20 which corresponds with the characters upon the finger keys will be moved upwardly within the openings formed in the plates 40 and 20, and project above the upper surface of the plate. The sprocket 14 has an elongated hub 60 formed upon one side thereof, which hub has a multiple ratchet 61 keyed thereupon, as is clearly shown in Fig. 9 of the drawings. The supporting structure 1 of the logotype machine has a bracket 62 suspended therefrom, to which bracket is pivotally connected a lever 63. The lever 63 has a pawl 64 mounted upon one end thereof, which pawl engages the peripheral teeth 65 of the ratchet 61, for rotating the ratchet for moving the sprocket 17 forward one space, for regulating the distance between the letters to be formed upon the type bar. The lever 63 has a finger key 66 attached to its end opposite to the pawl 64, which key forms the shift key for shifting the sprocket 14 and the plates 40 and 20 carried thereby the necessary distance for providing the required amount of space between each number or character to be formed upon the type bar. A plurality of matrices 70 are slidably mounted in a matrix supporting frame 71, and they have lugs 72 mounted upon their rear ends, which lugs have coil-springs 73 secured thereto. The coil-springs 73 are wound about a spring retaining spool 74, so that they will tend to force the matrices outwardly, in the direction indicated by the arrow $a$ in Fig. 6 of the drawings. The springs 73 are secured to pins 73', which extend through the flanges 73ª of the spring retaining spool 74 and they are coiled about the core of the spool similar to the coiling of a clock spring. The free end of the springs 73 extend rearwardly and are connected to the rear ends of the matrices as is clearly shown in Fig. 16 of the drawings, so that they will force the matrices outwardly upon the release of the tension of the springs 73. The spring retaining spools 74 are rotatably mounted upon a shaft 75, which shaft is supported by suitable bearings 76, for rotation of the shaft for regulating the tension of the springs 73. The shaft 75 is normally held against rotary movement by any suitable means.

Figures 6, 7:
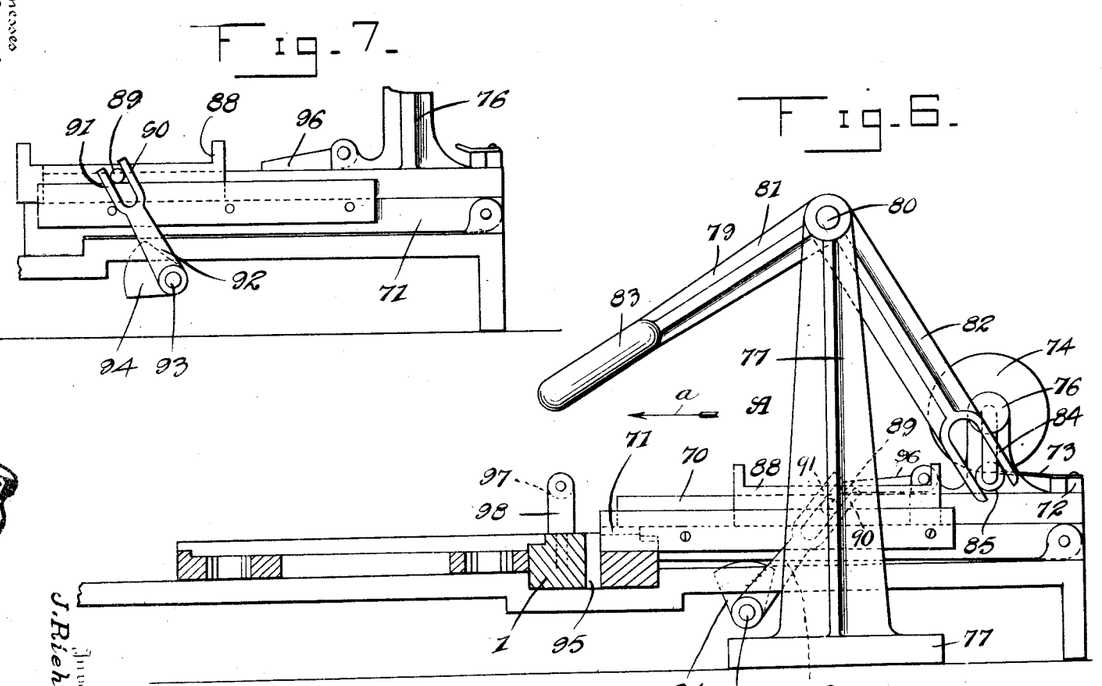
Fig. 6 is a detail side elevation of the matrices and the mechanism for operating and locking them in their adjusted position.
Fig. 7 is a detail view of the locking means for firmly holding the matrices in position.
Figure 8:
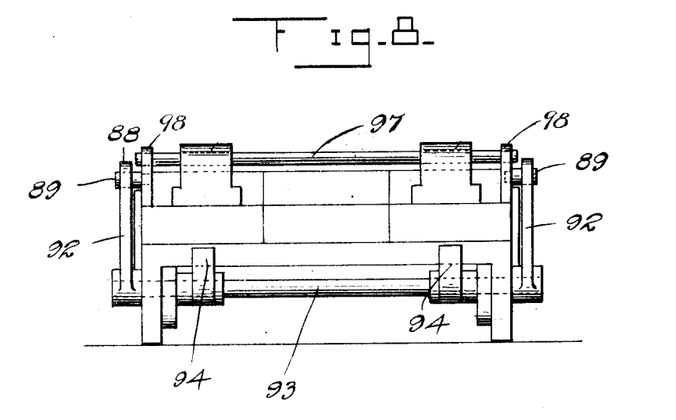
Fig. 8 is an end view of the mechanism illustrated in Fig. 7.

The supporting frame 1 has standards 77 and 78 secured thereto, which standards have an angled lever 79 pivotally mounted upon a shaft 80, which is journaled in their upper terminal ends. The angled lever 79 has its arms 81 and 82 disposed substantially at right angles to each other, and the arm 81 has a hand grip 83 formed thereon, while the arm 82 has its terminal end bifurcated as is shown at 84, which bifurcated end receives a roller 85 therein. The roller 85 is carried by the matrix supporting frame 71, so that when the lever 79 is operated the matrix bars will be shoved forward by the springs 73 until the roller 85 reaches the terminus of the bifurcated portion of the arm 82, when the matrice bars will be forced farther forwardly by the action of the levers. The matrix bar supporting frame 71 has a pair of plates 88 secured thereto, which plates have transversely extending pins 89 formed upon their sides. The pins 89 are seated between the arms 90 and 91 which are formed by the bifurcating of one end of a lever 92. The lever 92 is mounted upon a shaft 93, which shaft has a segmental cam 94 mounted thereupon, which cam engages at predetermined times the under surface of the matrix bar supporting frame 71, for elevating the forward end of the matrices for permitting of their free sliding movement over the various parts of the machine positioned in their path of travel. When the matrices are in their rearward position, preparatory to positioning for the forming of a type bar, or as is shown in Fig. 6 of the drawings, the lever 92 is positioned so that the segmental cam 94 will be in engagement with the under surface of the matrix supporting frame 71, elevating the same, or holding the forward end of the matrices in an elevated position with respect to the rear end thereof, and when the matrices are moved forward the pins 89 will travel between the arms 90 and 91, for a limited distance, after which the lever 92 will be actuated or moved forwardly, which will move the segmental cam 94 out of engagement with the under surface of the matrix bar supporting frame 71, permitting the matrices to fall downwardly and into a horizontal position as is shown in Fig. 7 of the drawings, at which times they are positioned over the casting slots 95, and are positioned preparatory to the forming of a line of type.

The matrix bar supporting frame 71 has a locking wedge 96 carried thereby and positioned near the rear end of the matrices, which locking wedge moves under a roller 97, which roller is supported by suitable supporting brackets 98, which are attached to the supporting frame 1 in any suitable manner.

Figure 15:
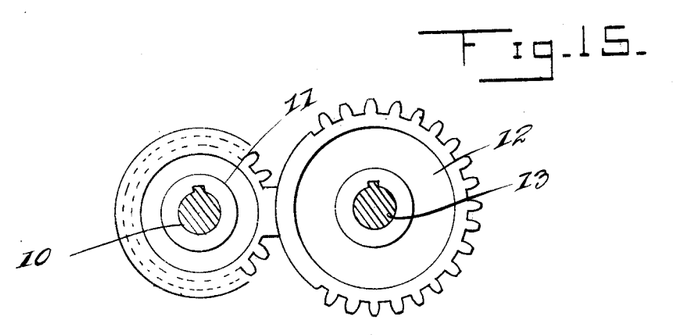
Fig. 15 is a detail view of the intermittent gears employed in operating parts of the mechanism.

When it is desired to form a line of type, the various finger keys are operated for projecting the respective pins 42 upwardly through the plates 40 and 20. For instance, when it is desired to make type for printing the numeral 273, the finger key 53 which bears the designating character 2 is operated, which forces upwardly the pin 42 corresponding thereto; after which the shift key 66 is operated, which moves the plate 40 and 20 forward one space, then the finger key 53 bearing the character 7 is operated, which moves upwardly the pin 42 corresponding thereto, after which the shift key 66 is again operated, and so on in succession, until the desired number of keys has been operated. After the pins 42 have been moved upwardly so that their upper ends project out of the plate 20, the foot treadle 32 is operated, which operates the clutch shell 26, causing it to engage in the clutch cone 25, which imparts rotation to the shaft 10 and to the shaft 13 through the meshing of the intermittent gears 11 and 12, and moves the plate 20 forwardly to a position in alinement with the matrices 70. When the plate 20 is in alinement with the matrices, movement of the sprocket chain 17 and the plates 20 and 40 will be stopped, owing to the spaces which are formed upon the intermittent gears 11 and 12 as is clearly shown in Fig. 15. After the plates 20 have been properly positioned in alinement with the matrices, the lever 79 is actuated for moving the matrices forwardly in their supporting or carrying frame 71. The matrices 70 move forward until they engage the respective pins 42 which have been pushed upwardly for projection above the upper surface of the plate 20, which pins stop the sliding movement of the matrices and position them over the casting slot 95, so that the designating characters which are engraved in the matrices and which correspond with the designating characters upon the finger keys which have been operated, will be properly positioned over the casting slot for the forming of the line of type, after which the mechanism for operating the melting pot and forming the type bar is operated.

The supporting structure 1 has a plate 100 secured thereto and positioned so that the inner face of the plates 40 will engage the same, after the plates have passed about the sprockets 14 and 15 and are on their return to position above the keyboard, for the operation of the pins 42 carried thereby. A roller 101 is mounted upon a stub shaft 102, and is positioned in alinement with the plate 100. The roller 101 has a cushioning cover 103 mounted upon its periphery, which cushioning cover engages the pins 42 upon the movement of the sprocket chain 17 and the plate 20, and forces the pins inwardly into the openings formed in the plates 20 and 40, and repositions them for reactuation by the lugs 52 which are operated by the finger keys 53.

*Melting pot and actuating mechanism therefor.*—The shaft 5 has a bevel gear 105 mounted thereupon, which bevel gear has a clutch cone 106 formed upon one face thereof. The shaft 5 also has a clutch sleeve or shell 107 feathered thereupon, for the reception of the clutch cone 106, by means of which the bevel gear 105 is rotated when desired. The clutch shell 107 is actuated by a lever 108, which lever is pivoted intermediate its ends at 109 to a bracket 110, and is positioned above the upper surface of the supporting frame for convenient access thereto. A shaft 111, which is supported by suitable bearing brackets 112 and 113 is mounted at right angles to the shaft 5, and it has a bevel gear 114 mounted thereon, which gear meshes with the bevel gear 105, for imparting rotation to the shaft 111. A channel cam 115 is mounted upon the shaft 111, and has a facial channel 116 formed therein. The channel 116 has a roller 117 rotatably mounted therein, which roller is carried by a lever 118. The lever 118 is pivotally connected in any suitable manner to the melting pot 120, so that upon the rotation of the shaft 111, the roller 117 will travel about within the channel 116 and operate the lever 118 for tilting the melting pot 120 when the roller reaches the portion of the channel furthermost from the central rotating axis of the channel cam 115. The melting pot 120 is pivotally supported by bracing arms 121' and 122', which arms are secured to the supporting frame 1 in any suitable manner.

Figure 5:
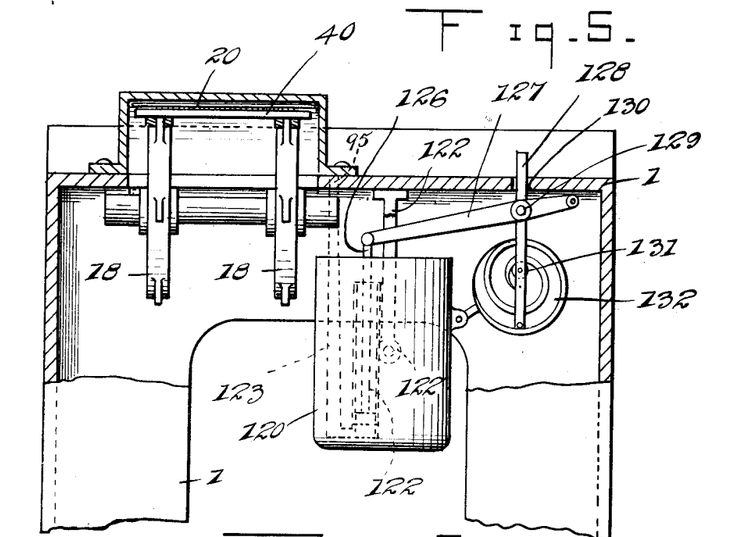
Fig. 5 is a detail cross sectional view through the machine, showing the construction of the melting pot and the means of tilting the same and breaking the connection between the metal therein and the type bars when the latter have been formed.

The melting pot 120 has a Bunsen burner 121 positioned in the lower portion thereof, for heating the type-metal which is placed in the retaining cup or part of the melting pot. The retaining portion of the melting pot 120 has a pump mechanism 122 mounted therein, which pump mechanism has an egress pipe 123 formed thereon, which pipe extends outwardly and communicates with the casting slot 95. The casing of the pump 122 has an ingress opening 124 formed therein, and a piston 125 is slidably seated in the body portion of the pump and has a piston rod 126 connected thereto and projecting upwardly out of the melting pot 120. The piston rod 126 is pivotally connected to a lever 127, which lever is in turn connected to a second lever 128, at 129, or intermediate its ends, as is clearly shown in Fig. 5 of the drawings.

The lever 128 is positioned vertically and is slidable through an opening 130, which is formed in a portion of the supporting structure 1. The lever 128 has a roller 131 secured thereto and projecting transversely therefrom, which roller has peripheral engagement with a spiral cam 132. The spiral cam 132 is mounted upon the terminal end of the shaft 111, and during the rotation of the shaft 111, the roller 131 will travel about the periphery of the various spiral portions of the cam 132, and operate the lever 128 in a vertical up and down movement, which will oscillate the lever 127 for operating the piston rod 126.

The operation of the piston rod 126 will move the piston 125 vertically within the pump casing, and upon its upward stroke will create a suction through the ingress opening 124, which will draw the molten metal into the pump casing, and on the downward movement of the piston 125, the metal will be forced upwardly out through the egressing pipe 123, and through the casting slot 95, and into engagement with the matrices which are positioned over the casting slot, and thus a bar of type is formed. The cams 115 and 132 are mounted upon the shaft 111 in respective relation to each other, so that immediately after the cam 132 has operated the piston rod 126 for forcing a charge of molten metal upwardly and out through the casting slot for forming a bar of type, the cam 115 will be positioned for tilting the melting pot 120, which will sever any connection between the bar of type and the metal which is retained within the egressing pipe 123, to permit of the ejection of the bar of type by a cam 133 and suitable mechanism 133', which cam is mounted upon the shaft 10 and moves upwardly, striking the metal bar of type immediately after the same has been cast.

Figure 1:
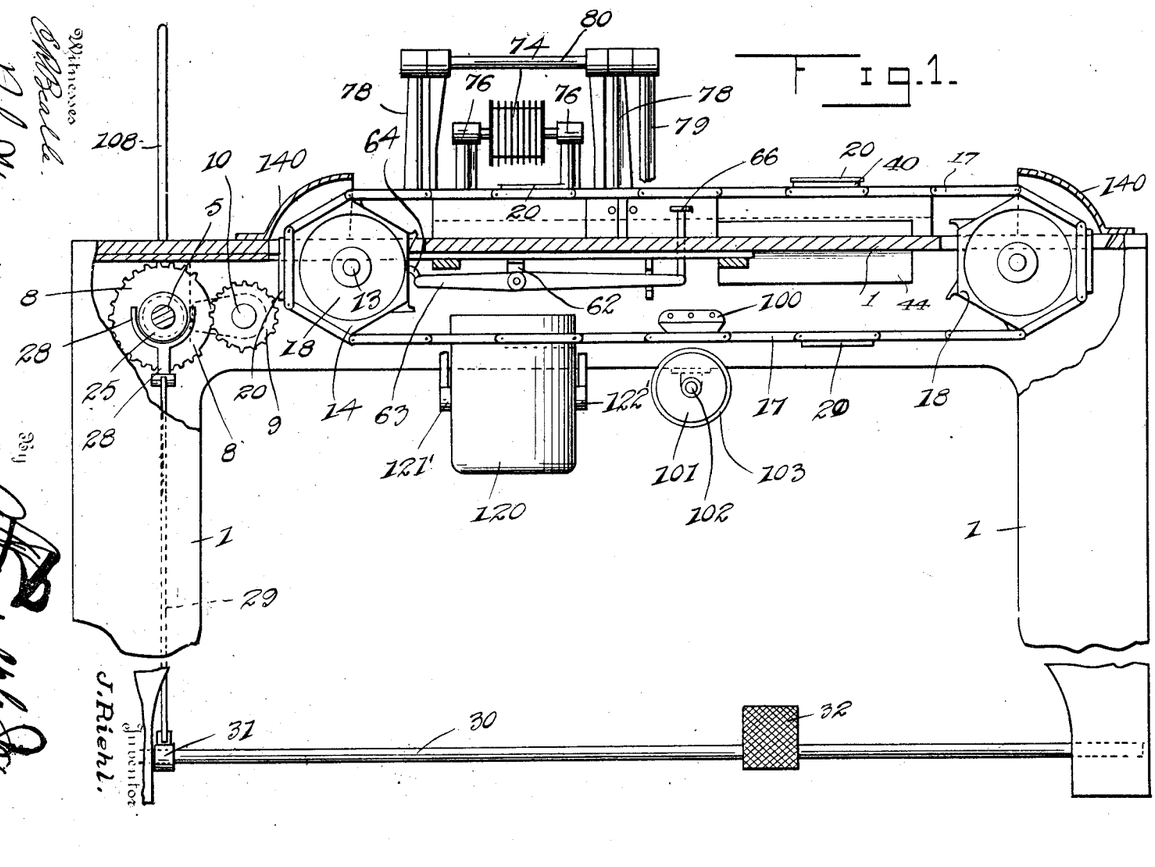
Figure 1 is a side elevation of the improved logotype machine, showing parts broken away to expose the internal mechanism thereof.
Figure 2:
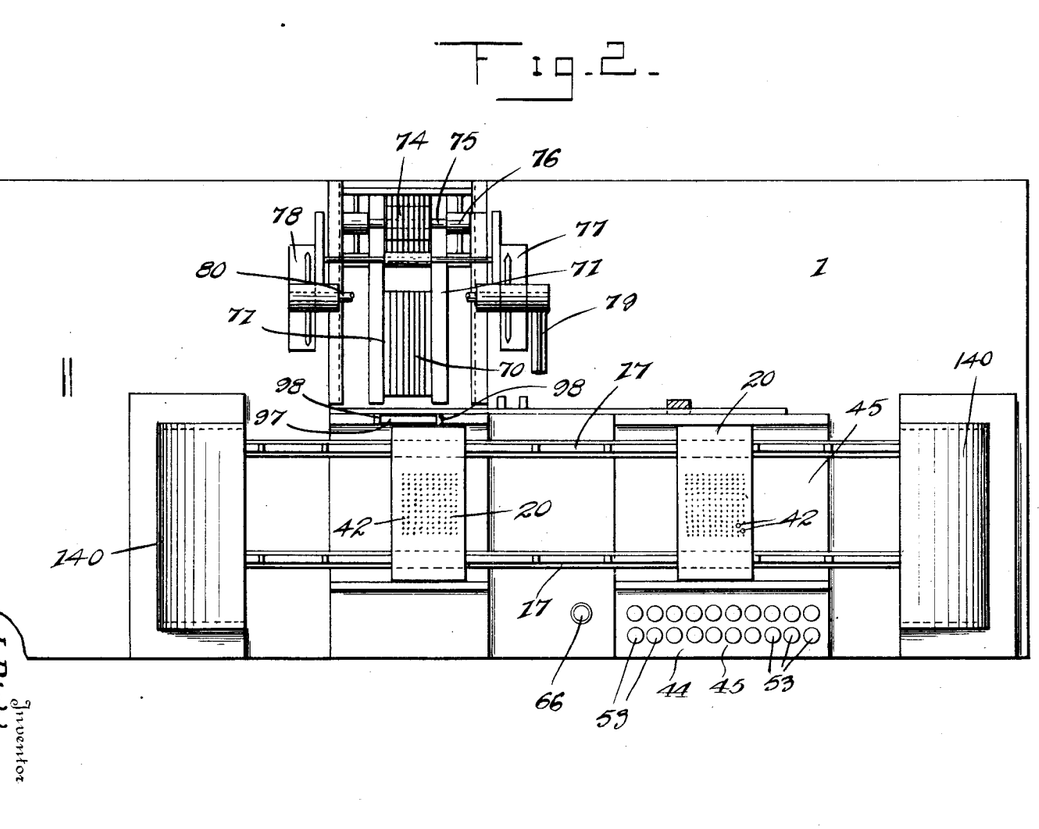
Fig. 2 is a top plan view of the improved logotype machine.
Figure 3:
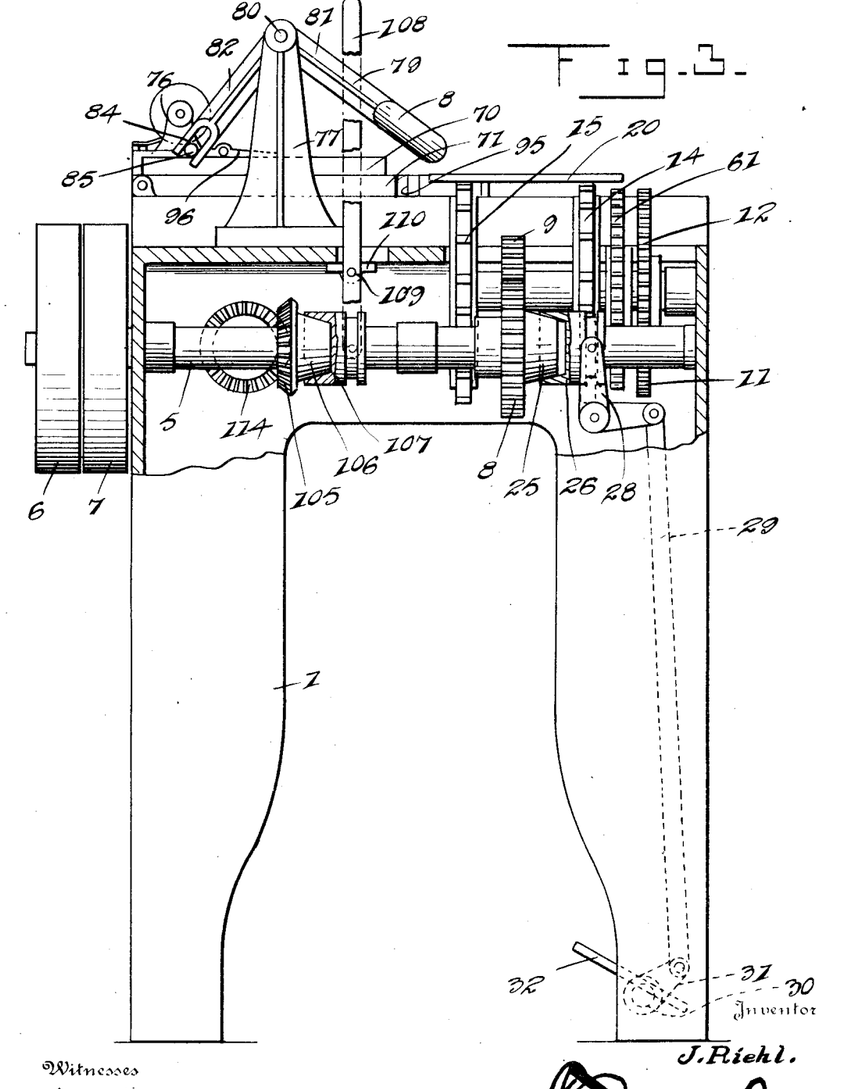
Fig. 3 is an end view of the machine, showing parts thereof broken away to expose the internal mechanism thereof.

The supporting structure 1 of the logotype machine has protective casings 140 mounted thereon, which casings extend upwardly and over the sprockets 14, 15 and 18, as is clearly shown in Figs. 1 and 2 of the drawings.

*Operation.*—The operator of the machine will use the keyboard mechanism, and by tapping the keys 53 which bear the desired numbers, drive the corresponding pins 42 upwardly in the plates 20. Then by shifting the key 66 the plate 20 will be moved forward by means of the multiple ratchet 61 which is keyed about the hub of the sprocket 14. The shifting of the multiple ratchet wheel 61 will move the sprocket chains 17 forward one space, and by repeating the operation of alternately operating the finger keys 53 and the spacing key 66, the desired line of figures is set up. After the desired number of pins 42 for regulating the numbers of characters to be formed on the line of type have been moved upwardly out of the plates 20, the treadle 32 is pressed downwardly, which will force the clutch shell 26 into engagement with the clutch cone 27, and rotate the gear 8 and the shaft 10 through the meshing engagement of the gears 8 and 9, which will in turn rotate the intermittent gears 11 and 12, and move the sprocket chain 17 forwardly until the plate 20 is positioned in alinement with the matrices, and the casting slot 95. The lever 79 is then moved forward and the matrices 70 are positioned over the casting slot 95, the characters engraved therein being regulated in their positioning by the upstanding pins 42. Upon the forward movement of the matrices 70, the locking wedge 96 will move under the roller 97, and firmly lock the matrices in proper position. After the matrices are properly locked in their respective positions, the lever 108 is actuated, which moves the clutch shell 107 into engagement with the clutch cone 106, and operates the shaft 111, which imparts rotation to the spiral cam 132 and operates the pumping mechanism 122 which is positioned in the melting pot 120 and forces a charge of the molten metal upwardly through the casting slot 95 and into engagement with the matrices, forming a line of type. Immediately after the charge of molten metal has been forced upwardly through the casting slot, the channel cam 115 will tilt the melting pot and break the connection between the type bar and the metal which is retained in the egressing pipe of the pumping mechanism. By throwing the levers 108 and 79 back into their normal position, the matrices will be replaced ready for the next operation. When casting the next line of type, the moving of the foot treadle 32 will operate the cam 132 and eject the cast type bar without extra movement of the shaft 10, or the cam 132 carried thereby. During the travel of the sprocket chain, the plates 20 will be brought into contact with the plate 100 and the periphery of the roller 101, which will reposition the slidable pins 42 for reoperation by the keyboard.

What I claim is:—

1. In a logotype machine, the combination with a plurality of slidable matrices, of a finger keyboard, a plurality of pins operable by said keyboard for limiting the movement of said matrices, means for automatically repositioning said pins after the forming of a type bar, and a plurality of flat springs bent sinuously about said pins for holding them against accidental sliding movement.

2. In a logotype machine, the combination with a plurality of slidable matrices, of a finger keyboard, a plurality of pins operable by said keyboard for limiting the movement of said matrices, and a plurality of flat springs bent sinuously about said pins for holding them against accidental sliding movement.

3. In a logotype machine, a plurality of slidable matrix bars, a frame provided with a casting slot, a finger keyboard, means operable by said keyboard for automatically stopping said matrix bars when the proper matrix formed therein is positioned over said casting slot, and a wedge locking means for securely holding said matrices in position over said casting slot.

4. In a logotype machine, a plurality of slidable matrix bars, a frame provided with a casting slot, a finger keyboard, means operable by said keyboard for automatically stopping said matrix bars when the proper matrix formed therein is positioned over said casting slot, said matrix bars normally lying in a movement arresting position, and a lever actuated cam for tilting said matrix bars to permit of their free sliding movement.

5. In a logotype machine, a plurality of slidable matrix bars, a frame provided with a casting slot, a finger keyboard, means operable by said keyboard for automatically stopping said matrix bars when the proper matrix formed therein is positioned over said casting slot, said matrix bars normally lying in a movement arresting position, a lever actuated cam for tilting said matrix bars to permit of their free sliding movement, a wedge locking means for securely holding said matrix bars positioned over said casting slot.

6. In a logotype machine, a plurality of slidable matrix bars, a spring retaining spool positioned rearwardly of said matrix bars, and coil-springs secured to said spring retaining spool and said matrix bars for forcing said bars outwardly on release for movement.

7. In a logotype machine, a plurality of slidable matrix bars, a frame provided with a casting slot, a finger keyboard, a plurality of pins operable by said keyboard for limiting the movement of said matrices, a lever actuated cam for tilting said matrices for permitting of their slidable movement, a wedge locking means for securely locking said matrix bars positioned over said casting slot, and a plurality of coil-springs connected to said matrix bars for moving them forwardly over said casting slot.

8. In a logotype machine, a plurality of slidable matrix bars, a frame provided with a casting slot, a finger keyboard, a plurality of pins operable by said keyboard for limiting the movement of said matrices, a lever actuated cam for tilting said matrices for permitting of their slidable movement, a wedge locking means for securely locking said matrix bars positioned over said casting slot, a plurality of coil-springs connected to said matrix bars for moving them forwardly over said casting slot, and means for automatically repositioning said slidable pins after the forming of a type bar.

9. In a logotype machine, a plurality of slidable matrix bars normally lying in a movement arresting position, and a lever actuated cam for engaging the under surface of said matrix bars and tilting them for free sliding movement.

10. In a logotype machine, a plurality of matrix bars, a frame provided with a casting slot, and a wedge slidable with said matrix bars for securely locking them when positioned over said casting slot.

11. In a logotype machine, a plurality of slidable matrices, a plurality of plates carried by sprocket chains and spaced at intervals about the length of the chain, a plurality of pins slidably carried by said plates and adapted for successive operation for projection above said plates, and means for moving said pins in alinement with said matrices for limiting the sliding movement thereof.

12. In a logotype machine, a plurality of slidable matrices, sprocket chains, intermittent gears for intermittently moving said sprocket chains, plates carried by said sprocket chains at spaced intervals, and means carried by said plates for regulating the movement of said slidable matrices.

13. In a logotype machine, a plurality of slidable matrices, sprocket chains, plates carried by said sprocket chains at spaced intervals, a plurality of slidable pins carried by said plates, a finger keyboard mechanism for operating said slidable pins, a spacing key for moving said sprocket chains and said plates forwardly one space, and intermittent gears for intermittently operating said sprocket chains for moving said plates into alinement with said slidable matrices for positioning said pins for limiting the sliding movement of said matrices.

14. In a logotype machine, a plurality of slidable matrix bars, means for restraining movement of said bars, and a plurality of coil-springs secured to said matrix bars for forcing them outwardly on release from said restraining means.

15. In a logotype machine, a plurality of slidable matrices, sprocket chains, plates carried by said sprocket chains at spaced intervals, a plurality of slidable pins carried by said plate, a finger keyboard mechanism for operating said slidable pin, and a spacing key for moving said sprocket chains and said plates forwardly one space.

16. In a logotype machine, a plurality of slidable matrices, sprocket chains, plates carried by said sprocket chains at spaced intervals, a plurality of slidable pins carried by said plates, a finger keyboard mechanism for operating said slidable pins, a spacing key for moving said sprocket chains and said plates forwardly one space, and a plurality of flat springs bent sinuously about said pins for holding them against accidental sliding movement.

17. In a logotype machine, a plurality of slidable matrices, sprocket chains, plates carried by said sprocket chains at spaced intervals, a plurality of slidable pins carried by said plates, a finger keyboard mechanism for operating said slidable pins, a spacing key for moving said sprocket chains and said plates forwardly one space, intermittent gears for intermittently operating said sprocket chains for moving said plates into alinement with said slidable matrices for positioning said pins for limiting the slidable movement of said matrices, and means for automatically repositioning said slidable pins after the forming of a type bar.

18. In a logotype machine, a plurality of slidable matrices, sprocket chains, plates carried by said sprocket chains at spaced intervals, a plurality of slidable pins carried by said plates, a finger keyboard mechanism for operating said slidable pins, a spacing key for moving said sprocket chains and said plates forwardly one space, means for moving said plates and said pins into alinement with said matrices for limiting the sliding movement thereof, and means for automatically repositioning said slidable pins after the forming of a type bar.

19. In a logotype machine, a plurality of slidable matrices, plates, a plurality of slidable pins carried by said plates, means for positively operating said slidable pins for regulating the sliding movement of said matrices, and means for intermittently moving said plates into alinement with said slidable matrices for positioning the pins in alinement with said matrices.

20. In a logotype machine, a plurality of slidable matrices, plates, a plurality of slidable pins carried by said plates, means for positively operating said slidable pins for regulating the sliding movement of said matrices, and means for intermittently moving said plates into alinement with said slidable matrices for positioning the pins in alinement with said matrices, and means for automatically repositioning said slidable pins after the forming of a type bar.

21. In a logotype machine, a plurality of slidable matrices, plates, a plurality of slidable pins carried by said plates, means for positively operating said slidable pins for regulating the sliding movement of said matrices, and means for intermittently moving said plates into alinement with said slidable matrices for positioning the pins in alinement with said matrices, means for automatically repositioning said slidable pins after the forming of a type bar, and a plurality of flat springs bent sinuously about said pins for holding them against accidental sliding movement.

22. In a logotype machine, a plurality of slidable matrices, a plurality of plates carried by sprocket chains and spaced at intervals about the length of the chain, a plurality of pins carried by said plates and adapted for successive operation for projection above said plates, means for moving said pins in alinement with said matrices for limiting the sliding movement thereof, and a plurality of flat springs bent sinuously and interwoven among said pins for frictionally engaging and holding them against accidental sliding movement.

23. In a logotype machine, a plurality of slidable matrices, a plurality of plates carried by sprocket chains at spaced intervals about the length of said chain, a plurality of pins slidably carried by said plates and adapted for successive operation for projection above said plate, means for moving said pins in alinement with said matrices for limiting the sliding movement thereof, and means for automatically depressing said pins upon movement of said pins from alinement with said matrices.

24. In a logotype machine, a plurality of slidable matrices, a frame provided with a casting slot, a roller supported horizontally by said frame, and a wedge slidable with said matrice bars for engagement with said roller for securely locking said matrices when positioned over said casting slot.

25. In a logotype machine, a plurality of slidable matrices, a frame provided with a casting slot, a roller supported horizontally by said frame, and a wedge slidable with said matrice bars for engagement with said roller for securely locking said matrices when positioned over said casting slot, a plurality of plates carried by sprocket chains and spaced at intervals about the length of the chain, a plurality of pins slidably carried by said plates and adapted for successive operation for projection above said plates, and means for moving said pins into alinement with said matrices for limiting the slidable movement thereof.

26. In a logotype machine, a plurality of slidable matrices, a frame provided with a casting slot, a roller supported horizontally by said frame, and a wedge slidable with said matrice bars for engagement with said roller for securely locking said matrices when positioned over said casting slot, a plurality of plates carried by sprocket chains and spaced at intervals about the length of the chain, a plurality of pins slidably carried by said plates and adapted for successive operation for projection above said plates, and means for moving said pins into alinement with said matrices for limiting the slidable movement thereof, and means for automatically depressing said pins upon movement of said pins from alinement with said matrices.

In testimony whereof I affix my signature in presence of two witnesses.

JUSTUS RIEHL.

Witnesses:
CLARENCE E. ELDERKIN,
M. A. SEIPPEL.